(No Model.)
F. SALATHÉ.
SWIVEL.
No. 515,023.          Patented Feb. 20, 1894.
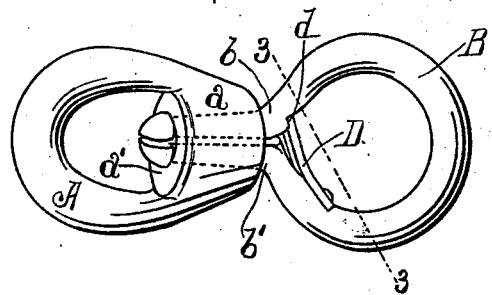
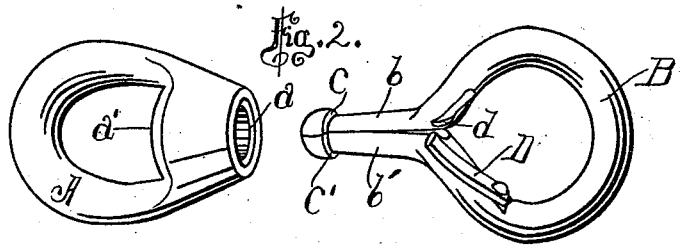
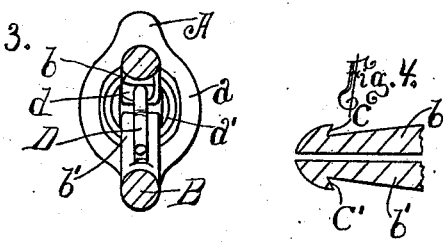
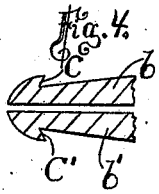
Witnesses.          Inventor.
P. W. Harbison.
Alfred D. Townsend.
Frederick Salathé
by Hazard & Townsend
his Attys.

UNITED STATES PATENT OFFICE.

FREDERICK SALATHÉ, OF SANTA PAULA, CALIFORNIA.

SWIVEL.

SPECIFICATION forming part of Letters Patent No. 515,023, dated February 20, 1894.

Application filed July 12, 1893. Serial No. 480,269. (No model.)

*To all whom it may concern:*

Be it known that I, FREDERICK SALATHÉ, a citizen of the United States, residing at Santa Paula, in the county of Ventura and State of California, have invented a new and useful Separable Swivel, of which the following is a specification.

The object of my invention is to provide cheap, simple, and effective means for uniting rods, chains, wire cables, &c., which will serve as a swivel and which will also allow the parts united to be conveniently detached from each other and again secured together at pleasure.

The accompanying drawings illustrate my invention.

Figure 1 is a perspective view showing the swivel with its parts in the united position. Fig. 2 shows the swivel with its parts separated and in position to be again united. Fig. 3 is a section on line 3—3 Fig. 1. Fig. 4 is a longitudinal section of the ends of segmental shanks.

The female member of the swivel comprises the loop or eye A provided with the ordinary swivel socket and bearing $a, a'$. The male member comprises an open loop or eye B with its free ends respectively provided with segmental shanks $b\ b'$ which are adapted to be moved from and toward each other and are provided with the bearing shoulders or knobs $c\ c'$ and are adapted to form the swivel shank which when inserted in the female member and sprung apart cannot be withdrawn from the male member but which can be inserted into and withdrawn from the female member when the segmental shanks are brought together as shown in Fig. 2.

D is a spreading dog pivoted to one member of the loop or eye B of the male member and arranged to engage the other member of such loop to hold the shanks apart to lock the swivel together as shown in Fig. 1.

$d$ is a sloping shoulder which the separating dog engages when swung around to separate the loop B. The dog thus acts upon the loop in the manner of a wedge to force the shanks apart.

Preferably the loop or eye B of the male member normally springs together so that when the dog is thrown out as shown in Fig. 2 the shanks will be brought together by the spring or elasticity of the loop.

In practice, the shanks sprung together as shown in Fig. 2 are inserted into the socket $a$ and then the dog D is forced into the position shown in Fig. 3 thus forcing the shanks $b\ b'$ apart thus bringing the shoulders $c\ c'$ into position to engage the bearing face $a'$ to prevent the withdrawal of the swivel shank. The swivel then acts in the same way as an ordinary swivel until it is desired to separate the rod, chain, or cable thus united. Then the dog D is driven out into the position shown in Fig. 2 thus allowing the segmental shanks $b\ b'$ to spring together so that the shoulders $c\ c'$ will be allowed to pass through the socket $a$ thus allowing the male and female members to separate.

In practice the segmental shanks can be spread apart by a wedge inserted between them, or by other suitable means, and I do not limit my claim exclusively to the use of the dog for this purpose.

The shoulders $c\ c'$ may be barb shape if desired to set into the bearing $a'$ and thus serve to assist in holding the shanks apart when strain is applied to the swivel. Such barb shape is indicated in Fig. 4.

Now, having described my invention, what I claim as new, and desire to secure by Letters Patent, is—

1. The combination of the female member provided with the socket and bearing; the male member comprising an open eye having its ends respectively provided with shanks having the bearing shoulders and adapted to be sprung apart to form the swivel shank, and a suitable dog for holding the shanks apart.

2. The combination of the female member provided with the socket and bearing; the male member comprising an open eye having its ends respectively adapted to spring together and provided with shanks which are adapted to unitedly form the swivel shank when sprung apart, and the spreading dog pivoted to one member of the eye and adapted to engage the other member of the eye to hold the shanks apart.

3. The combination of the female member provided with the socket and bearing; the male member comprising an open eye adapted to spring together and having its ends respectively adapted to unitedly form the swivel shank, and having one of its members provided with the oblique dog receiving face; and the separating dog pivoted to the other member of the eye and adapted to engage such oblique face.

FREDERICK SALATHÉ.

Witnesses:
JAMES R. TOWNSEND,
W. A. CARNEY.